United States Patent [19]
Permanne

[11] Patent Number: 5,986,580
[45] Date of Patent: Nov. 16, 1999

[54] FLIGHT CONTROL INDICATOR FOR AIRCRAFT

[75] Inventor: Alain Permanne, Velaux, France

[73] Assignee: Eurocopter, Marignane Cedex, France

[21] Appl. No.: 09/209,238

[22] Filed: Dec. 10, 1998

[30] Foreign Application Priority Data

Dec. 22, 1997 [FR] France ................................ 97 16228

[51] Int. Cl.[6] .................................................. G08B 21/00
[52] U.S. Cl. .................... 340/946; 73/178 H; 244/17.11; 340/863; 701/14
[58] Field of Search ........................... 340/963, 971, 340/946, 978; 73/178 H; 701/9, 14, 3, 99; 244/17.11

[56] References Cited

U.S. PATENT DOCUMENTS

| | | |
|---|---|---|
| 3,287,965 | 11/1966 | Brahm et al. . |
| 3,616,691 | 11/1971 | Brandau . |
| 4,034,605 | 7/1977 | Green ..................................... 73/178 H |
| 4,179,938 | 12/1979 | Schramm . |
| 4,736,331 | 4/1988 | Lappos et al. ......................... 73/178 H |
| 5,339,244 | 8/1994 | Stiles, Jr. et al. ........................ 340/963 |
| 5,886,649 | 3/1999 | Francois ................................. 340/963 |

FOREIGN PATENT DOCUMENTS

| | | |
|---|---|---|
| WO 96/26472 | 8/1996 | WIPO . |
| WO 97/42466 | 11/1997 | WIPO . |

*Primary Examiner*—Brent A. Swarthout
*Attorney, Agent, or Firm*—Fisher, Christen & Sabol

[57] ABSTRACT

A flight control indicator for twin-engine aircraft, in particular a rotary-wing aircraft comprising two turboengines for driving at least one rotor, intended to provide the power margin available on the engines of the aircraft as a function of the flight conditions. Display means (6) presents a single dial (8) furnished with two needles ($9_1$, $9_2$), each of them corresponding to a respective engine, and positioned in such a way that, when the engines are operating normally, the two needles are merged.

11 Claims, 5 Drawing Sheets

FLIGHT CONTROL INDICATOR FOR AIRCRAFT

BACKGROUND OF THE INVENTION

1. Field of the Invention

The present invention relates to a flight control indicator for aircraft.

Such an indicator is more specifically adapted to a rotary-wing aircraft, especially a helicopter.

2. Background Art

The flight of a helicopter is controlled by monitoring numerous instruments on the flight panel, which instruments are for the most part representative of the operation of the engine assembly and of the aircraft. For physical reasons there are numerous limitations which the pilot must take into account at each moment of the flight. These various limitations generally depend on the flight phase and on the outside conditions.

Most helicopters constructed at present are equipped with one or two turboengines, generally of the free turbine type. The power is then tapped off from a low-pressure stage of the turbine, which stage is mechanically independent of both the compressor and the high-pressure stage of the turbine. The power turbine of a turboengine rotating at between 20,000 and 50,000 revolutions a minute, a special reduction box is necessary for the link to the rotor(s): the main gearbox (BTP).

The thermal limitations of the engine and the torque limitations of the main gearbox make it possible to define three normal regimes of engine use:

- the takeoff regime, which can be used for five to ten minutes, corresponding to a gearbox torque level and engine turbine heatup which are acceptable for a limited time without appreciable degradation: this is the maximum power at takeoff (PMD),

- the maximum continuous regime during which, at no time are either the capabilities of the gearbox or those resulting from the maximum acceptable continuous heatup in front of the high-pressure blading of the first stage of the turbine exceeded: this is the maximum continuous power (PMC),

- the maximum transient regime, possibly buttressed by regulation: we then speak of maximum transient power (PMT).

There are also emergency overpower regimes on multi-engine machines, used in the event of a faulty engine:

- the emergency regime during which the capabilities of the gearbox on the input stages and the thermal capabilities of the engine are used to the maximum: we speak of superemergency power (PSU) which can be used for 30 seconds running, at most, and three times during a flight. Use of the PSU entails the dismantling and overhauling of the engine;

- the emergency regime during which the capabilities of the gearbox on the input stages and the capabilities of the engine are largely used: we then speak of maximum emergency power (PMU) which can be used for two minutes after the PSU or two minutes thirty seconds running, at most;

- the emergency regime during which the capabilities of the gearbox on the input stages and the thermal capabilities of the engine are used without damage: we speak of intermediate emergency power (PIU) which can be used for thirty minutes or continuously for the remainder of the flight following the engine fault.

The engine manufacturer establishes, through calculations or tests, the curves of available power of a turboengine as a function of altitude and temperature, and does so for each of the regimes defined above.

The limitations indicated are generally monitored via three parameters: the gas generator regime (Ng), the engine torque (Cm) and the free turbine inlet gas ejection temperature (T4).

French patent application FR-96 07040 discloses a flight control indicator which identifies, among the essential engine monitoring parameters, the one which is closest to its limit. The information relating to the limitations to be complied with are thus grouped together on a single display, thereby making it possible, on the one hand, to produce a summary and present only the result of this summary so as to simplify the pilot's task and, on the other hand, to save space on the instrument panel. A "limiting parameter" is thus obtained from among said engine monitoring parameters, the current value of which is closest to the limit value for said parameter. For this reason, such an indicator will hereinafter also be designated by the expression "first limitation instrument", or "IPL" for short.

BROAD DESCRIPTION OF THE INVENTION

The present invention constitutes a development of the subject-matter of the above-cited document.

For this purpose, the flight control indicator for twin-engine aircraft, in particular a rotary-wing aircraft comprising two turboengines for driving at least one rotor, intended to provide the power margin available on the engines of the aircraft as a function of the flight conditions, comprising:

sensors able to deliver information relating to various parameters for monitoring the engines, namely the gas generator regime (Ng), the free turbine inlet gas ejection temperature (T4), the engine torque (Cm), means for processing the information arising from said sensors, and display means which present, on a display screen, the processed information relating to the parameter, from among said monitoring parameters, whose current value is closest to the limit value for said parameter, is noteworthy, according to the invention, in that said display means present a single dial furnished with two needles, each of them corresponding to a respective engine, and positioned in such a way that, when the engines are operating normally, the two needles are merged.

Thus, the use of such an IPL makes it possible in particular to monitor the main power gearbox by knowing, on the one hand, the sum of the two engine torques, at the output of the main gearbox, during normal twin-engine operation and, on the other hand, the torque of the engine which is still running, at the input of the main gearbox, during single-engine operation.

Advantageously, for each engine, one mode, from among the various possible modes of operation of the engines, is automatically selected and displayed on said dial as a function of the state of the engines and/or of one engine with respect to the other.

Preferably, for each mode of operation of the engines, the corresponding limitations, in particular power limitations, are presented on said dial.

In particular, in startup mode, only the two limits of T4 at startup are presented.

Advantageously, the true numerical values of the various parameters and/or of the messages relating to the operation of the engines are displayed on said display means.

BRIEF DESCRIPTION OF THE DRAWINGS

The figures of the appended drawing will elucidate the manner in which the invention may be practiced. In these figures, identical references designate similar elements.

DETAILED DESCRIPTION OF THE DRAWINGS AND THE INVENTION

Figure 1:
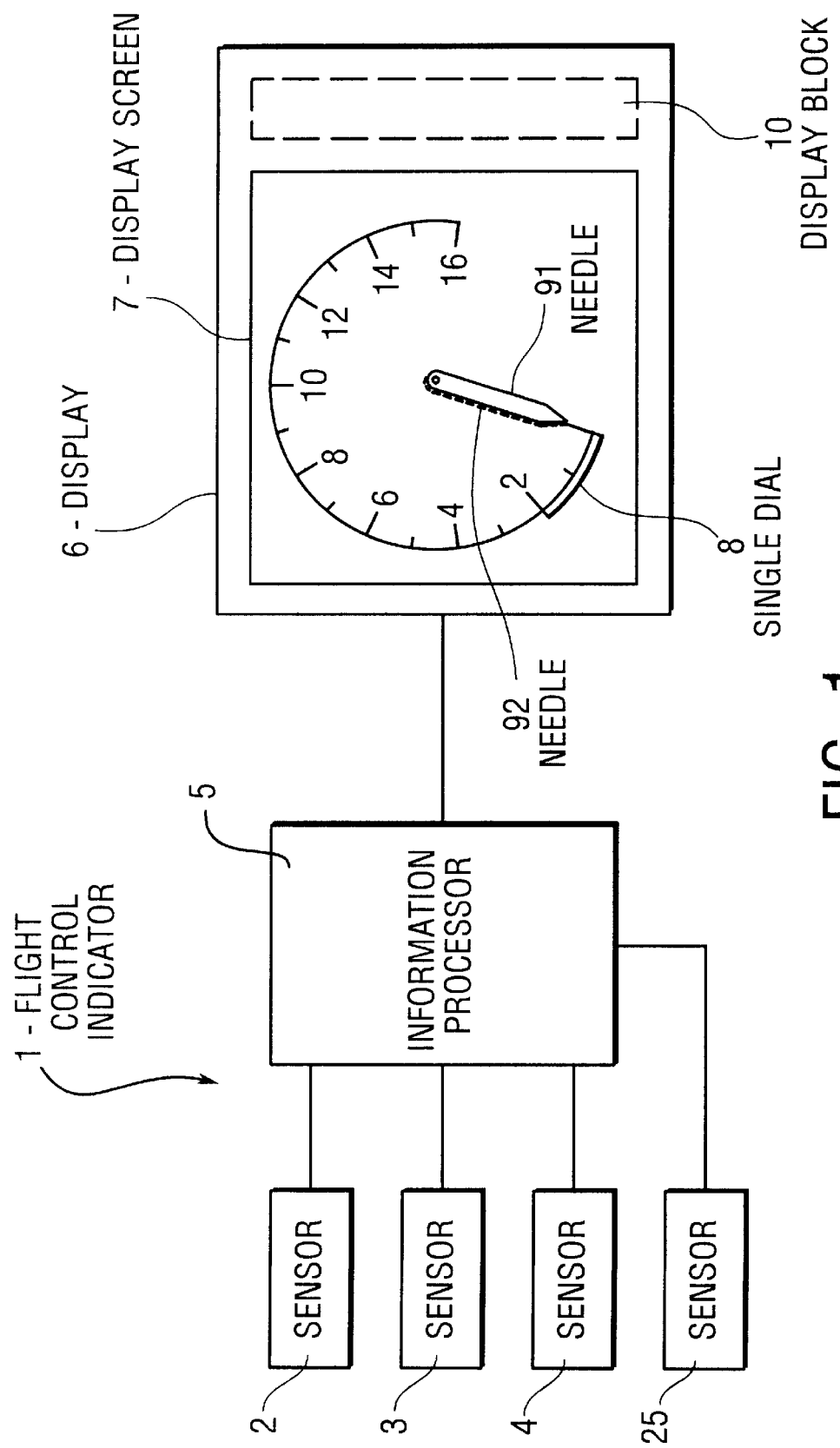
FIG. 1 is a schematic diagram of the flight control indicator according to the invention.

With regard to FIG. 1, the flight control indicator 1 for twin-engine aircraft, in particular rotary-wing aircraft comprising two turboengines for driving at least one rotor, intended to provide the power margin available on the engines of the aircraft as a function of the flight conditions, comprising:

sensors 2, 3, 4 able to deliver information relating to various parameters for monitoring the engines, namely the regime of the gas generator (Ng), the free turbine inlet gas ejection temperature (T4), the engine torque (Cm), sensors 25 able to deliver information about the state of the engines and their environments, means 5 for processing the information arising from these sensors 2, 3, 4, 25, and display means 6 which present, on a display screen 7, the processed information relating to the parameter, from among the monitoring parameters, whose current value is closest to the limit value for this parameter.

It will be noted that the sensors relating to the state of the engines correspond to the electrical consumption or else to the bleeding off of air, to the presence of optionals, to the forward speed of the helicopter, in particular.

As regards the environment, this may involve indications and measurements of ambient temperature, ambient pressure, in particular.

According to the invention, the display means 6 present a single dial 8 furnished with two needles $9_1$, $9_2$, each of them corresponding to a respective engine, and positioned in such a way that, when the engines are operating normally, the two needles are merged. In FIG. 1, the position of the needles $9_1$, $9_2$ corresponds to an "out-of-service" state of the indicator.

Moreover, the block 10 indicates, symbolically, the displaying of the true numerical values of the various parameters or of messages relating to the operation of the engines.

The various possible modes of operation of the engines are defined as follows: startup (DEM), normal operation (AEO), fault with the other engine (OEI), training for a fault with the other engine (OEIE), regulating fault (OEI REG) or training for a regulating fault.

For each engine, one of these modes is automatically selected and displayed on the dial 8 as a function of the state of the engines and/or of one engine with respect to the other.

Moreover, should a parameter be unavailable, it is deleted from the IPL and a message is presented to the pilot.

The modes of operation of the engines may be sequenced as follows.

On initialization or when Ng for an engine is below 40% (anti-shutdown stop in manual mode), the startup mode is displayed or superimposed on the present mode. When the Ng values for the two engines are above 60% for t=1s, for example, the startup mode disappears.

Among the other modes, the logic may be as follows:

```
If selection tuition OEI then OEIE mode
    Else if OEI set on an engine
        then if Ng 1 or Ng2 > 40% and REG1 or 2 warning
                                                    light red
            then OEI REG mode
        Else OEI mode
        Endif
    Else AEO mode
    Endif
Endif
``` the REG warning light shows red in the event of a regulating fault or a switch to manual mode.

Figure 2A:
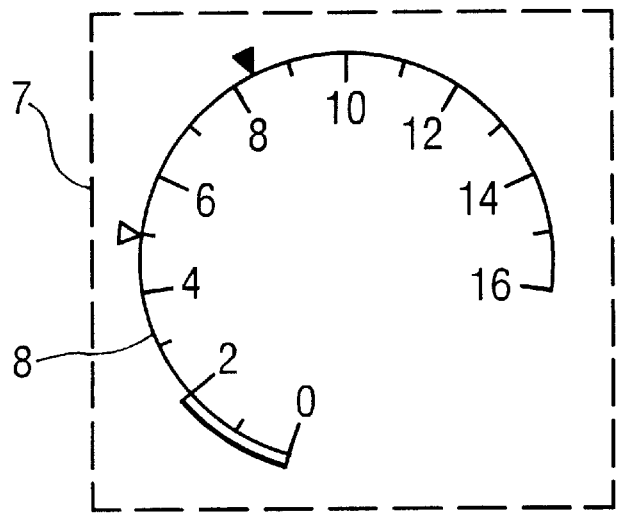
FIGS. 2A to 2C show the display screen, associated with the indicator of the invention, in various engine operating modes.

In startup mode only the two limits of T4 on startup are presented (FIG. 2A).

Figure 2B:
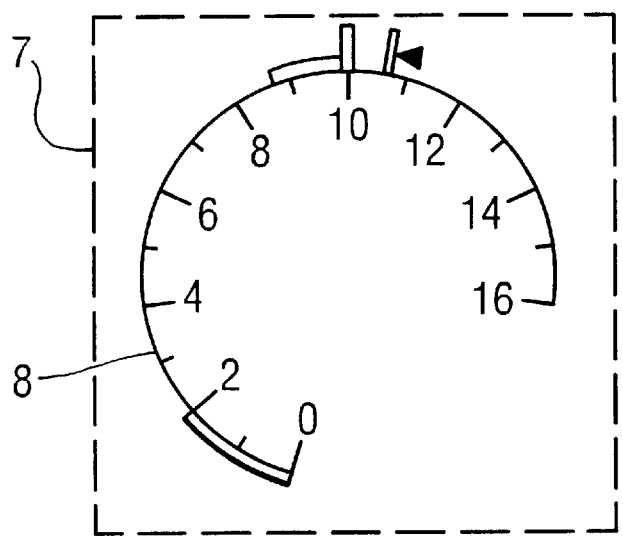

In AEO normal mode, the PMC, PMD and transient twin-engine (which is necessary to allow the PMD to be exceeded upon translational departure and on request for power from the tail rotor) limitations are presented (FIG. 2B). At the limit of T4, there is no twin-engine transient limit.

In OEI mode (FIG. 2C), the PIU (continuous), PMU (2 min), PSU (30 s) limitations are presented, as well as an additional marking corresponding to T4 possibly being exceeded, for example. The transient is not necessary since the regimes are at their extremes (verification of no excess during development tests).

In the event of a regulating fault or a switch to manual, the marking of the PMC is added to the OEI mode (OEI REG mode).

As regards training for a fault with an engine, the tuition mode is selected by the pilot. The same is presented as for the OEI mode. The FADEC computer sends overestimated measurements of torque and ΔNg so as to keep the same marking on the instrument of ΔNg without exceeding the limitations permitted in this case. The measurements of Cm and Ng must be corrected so that the same is presented as for the OEI mode. The numerical values presented are, on the other hand, the exact values measured.

As already indicated, for each engine, a needle presents, on a single dial, the smallest margin between Cm, Ng and T4. This corresponds, for a given mode of operation, to taking the highest % value of IPL between the Cm, Ng and T4 curves (see FIG. 3). For a given mode, there is never a needle jump, only the rate (corresponding to the slope of the curves) of movement of the needle may vary when crossing a limitation.

When the two engines are in startup mode, only the startup limitations are presented. As soon as the criterion for the normal mode of operation (AEO) is achieved on the first engine, the limitations (AEO) appear with a jump by the needle which returns to 0 (change in the manner of calculating the position of the needle). The second engine is started up in its turn. After switching to AEO mode, the startup limitations disappear.

During normal operation at the torque limit:

the torque limitations being attained on the output epicycloid during AEO operation, it is therefore necessary to monitor Cm1+Cm2 (Cm1 corresponding to the engine torque of the first engine and Cm2 to the engine torque of the second engine). In engine fault mode (OEI), it is necessary to monitor the torque at the input of the engine while operating Cm1 or Cm2;

to do this, when the torques of the two engines are similar (given discrepancy ΔCm), under BTP limitation, the two needles of the IPL will be merged at the value (Cm1+Cm2)/2;

in the contrary case where the torques are greatly misaligned, the two needles will be presented at the values Cm1 and Cm2. The misalignment may be encountered in OEI mode or in the event of a defect in the torque measurement system. The discrepancy ΔCm will have to be sufficiently large for there to be a single needle presented during normal operation, considering the dispersion in the measurements on the engines.

During normal operation at the limit of Ng:

the engines are balanced in terms of Ng with an accuracy of ±0.2%, for example. Only the needle of the engine having the highest Ng is presented. In the event of a misalignment of greater than 0.2%, both needles are presented.

During normal operation at the limit of T4:

this limitation will be encountered only on an old engine, in the event of a problem or in the event that P2 is read off.

The switching of the relevant engine to OEI mode (or OEIE or OEI REG mode) may be accompanied by an upward jump of the needle, the amplitude of which is at most equal to the PMD PIU arc. When the limiting parameter is the torque, there is no jump.

The numerical indicators present the values actually measured on the engines together with limitations akin to those of the IPL.

For example, the torque limitation in AEO mode is displayed at the same time on both torque values when [(Cm1+Cm2)/2] is greater than the limitation at the output of the main gearbox, whereas the limitation in OEI mode is displayed when Cm1 or Cm2 is greater than the limitation at the input of the main gearbox.

For Ng and T4, the limitations are those of the relevant engine.

The parameters may originate from the engines, from the FADEC or from the VEMD.

By way of example, the parameters will be:

Ng and T4 for the engines, in respect of the FADEC: Ng, T4, torque, atmospheric pressure and outside temperature, etc.

in respect of the VEMD: atmospheric pressure, outside temperature, continuous helicopter speed, etc.

On a conventional instrument panel, there are three instruments per engine and the pilot is supposed to detect an inconsistency in the parameters. With the IPL, this consistency can no longer be undertaken by the pilot and must be carried out by the system.

Advantageously, a logic module makes it possible to detect a fault or a drifting in the sensors which deliver the information relating to said parameters by comparing with another sensor or reconstructing the information from the other sensors. For example, a law of consistency for Ng and the torque makes it possible to detect an anomaly with one of the Ng or torque parameters.

This logic module thus effects the choice of the valid information.

In the event that a parameter is not available following the detection of an anomaly, the logic module deletes the parameter from the IPL and replaces its limitation by an equivalent limitation on another parameter. For example, in the event that the torque is unavailable, the torque limit can be replaced by an Ng limit deduced from the torque limit by means of a theoretical model, this corresponding to a degraded mode of the IPL owing to the fact that the equivalent limit is less accurate than the replaced limit and a message signaling the degraded mode is presented on pilot.

Such logic will be the proper consistency of the parameters presented and hence makes the information from the IPL reliable.

The limitations are presented, by way of example, in Table 1 below for each of the parameters Ng, T4 and Cm associated with a value of IPL, that is to say their needle positional equivalence (IPL %).

The T4 and torque limitations are generally fixed but the invention can take fluctuating limits into account. For example, the torque could be indexed as a function of the altitude of the helicopter. Moreover, in the case where Ng is a flight control parameter, the Ng limitations can vary with ambient pressure, ambient temperature, the air readings P2 and the electrical reading.

The IPL thus takes the state of the engine into account automatically without it being necessary for the pilot to correct the limitations displayed.

Figure 2C:
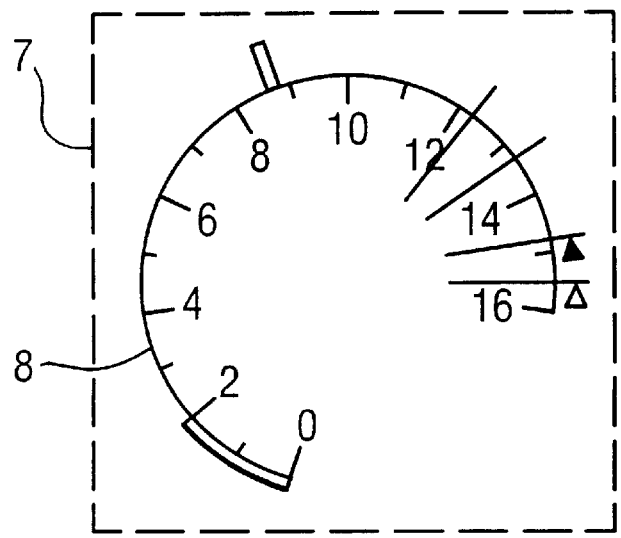

The markings (or graduations) presented in FIGS. 2A, 2B and 2C are generally fixed (however, they could be mobile) but correspond, however, to variable limitations.

Figure 3:
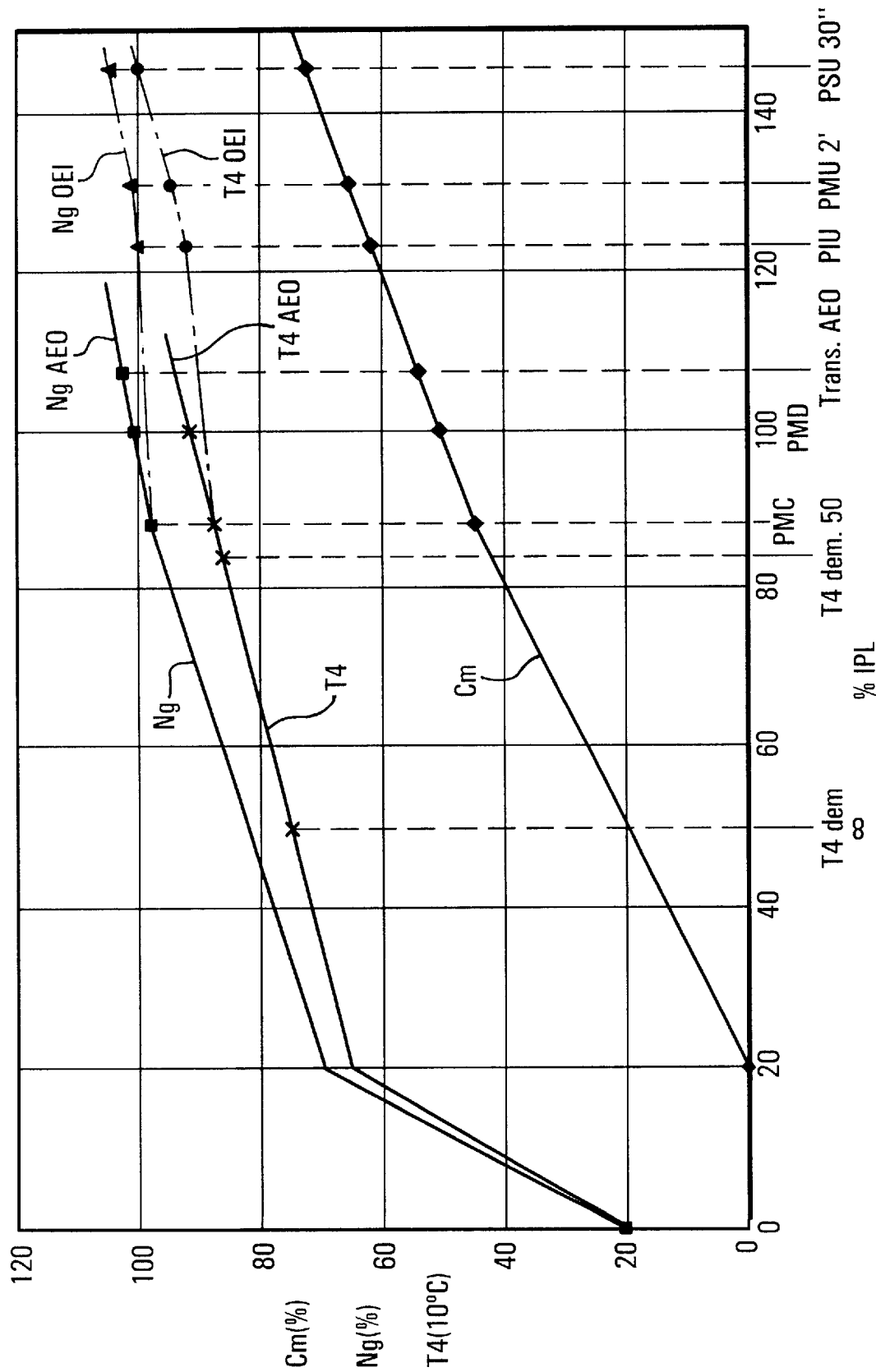
FIG. 3 is a curve giving, for each parameter, the position of the IPL needle in % as a function of the value of the measured parameter and of the mode of operation of the engine.

FIG. 3 gives, for each parameter Ng, T4 and torque Cm, the fluctuations in the value of the IPL.

The highest % value of IPL corresponding to the parameters Ng, T4 and Cm measured is then presented for each engine.

Insofar as the limitations are staged, a single curve is sufficient for the various modes of operation, for example the curve for the torque.

When this is not the case, several curves are necessary so as to prevent needle jumps in the same mode (for example Ng and T4).

From the practical point of view, the screen is graduated for example from 0 to 16.

Moreover, a graduation, for example 2, represents the value of the engine parameters corresponding to flight idle (zero power and nominal rotor revs) and the 0 graduation corresponds to an engine shutdown or almost shutdown state.

Advantageously, these two yardsticks make it possible, during flight, to differentiate between an idling engine and an engine which is faulty or has shut down.

However, the first graduation of the IPL can correspond to the engine idle state (deletion of the close to engine shutdown state from the IPL) without however jeopardizing the principle of the IPL described.

TABLE 1

Startup mode

| marking | IPL % | | T4 (° C.) | |
|---|---|---|---|---|
| stop | 0 | | 200 | |
| 0 | 20 | | 650 | |
| T4sta ill. | 50 | | 750 | |
| T4 sta <10 s | 84 | | 865 | |

AEO mode

| marking | IPl (%) | Ng (%) | T4 (° C.) | Torque (%) |
|---|---|---|---|---|
| stop | 0 | 20 | 200 | N/A |
| 0 | 20 | 70 | 650 | 0 |
| PMC | 88 | NgPMC-derating (UI, P2, opt, tO, PO, R) | 877 | 44 |
| PMD | 100 | NgPMD-derating (UI, P2, opt, tO, PO, R) | 912 | 50 |
| PMT | 107 | 102.3 | | 53.5 |

AEOREG mode

| marking | IPL (%) | Ng (%) | T4 (° C.) | Torque (%) |
|---|---|---|---|---|
| stop | 0 | 20 | 200 | N/A |
| 0 | 20 | 70 | 650 | 0 |
| PMC | 88 | NgPMC-derating (UI, P2, opt, tO, PO, R) | 877 | 44 |
| PMD | 100 | NgPMD-derating (UI, P2, opt, tO, PO, R) | 912 | 50 |
| OEI 2 mm | 132 | NgPMU-derating (UI, P2, opt, tO, PO, R) | 941 | 65.8 |
| OEI 30 s | 146 | NgPSU-derating (UI, P2, opt, tO, PO, R) | 1000 | 72.9 |

OEI mode

| marking | IPL (%) | Ng (%) | T4 (° C.) | Torque (%) |
|---|---|---|---|---|
| stop | 0 | 20 | 200 | N/A |
| 0 | 20 | 70 | 650 | 0 |
| OEI infinite | 124 | NgPIU-derating (UI, P2, opt, tO, PO, R) | 912 | 61.9 |
| OEI 2 mm | 132 | NgPMU-derating (UI, P2, opt, tO, PO, R) | 941 | 65.8 |
| OEI 30 s | 146 | NgPSU-derating (UI, P2, opt, tO, PO, R) | 1000 | 72.9 |

Notes:
The derating of the flight control law is performed as a function of:
UI electrical reading taken from the gas generator
P2 reading from the airstream
opt are optionals
TO ambient temperature
PO ambient pressure
For each engine operating mode, the value of the IPL is the largest value calculated for each of the parameters Ng, T4 and Torque R regime (PMC, PMD, etc.).

Limitations are also presented, by way of variant, in Table 2 below for each of the parameters Ng, T4 and Cm, and the choice is the needle positional equivalence (IPL %).

Figure 4:
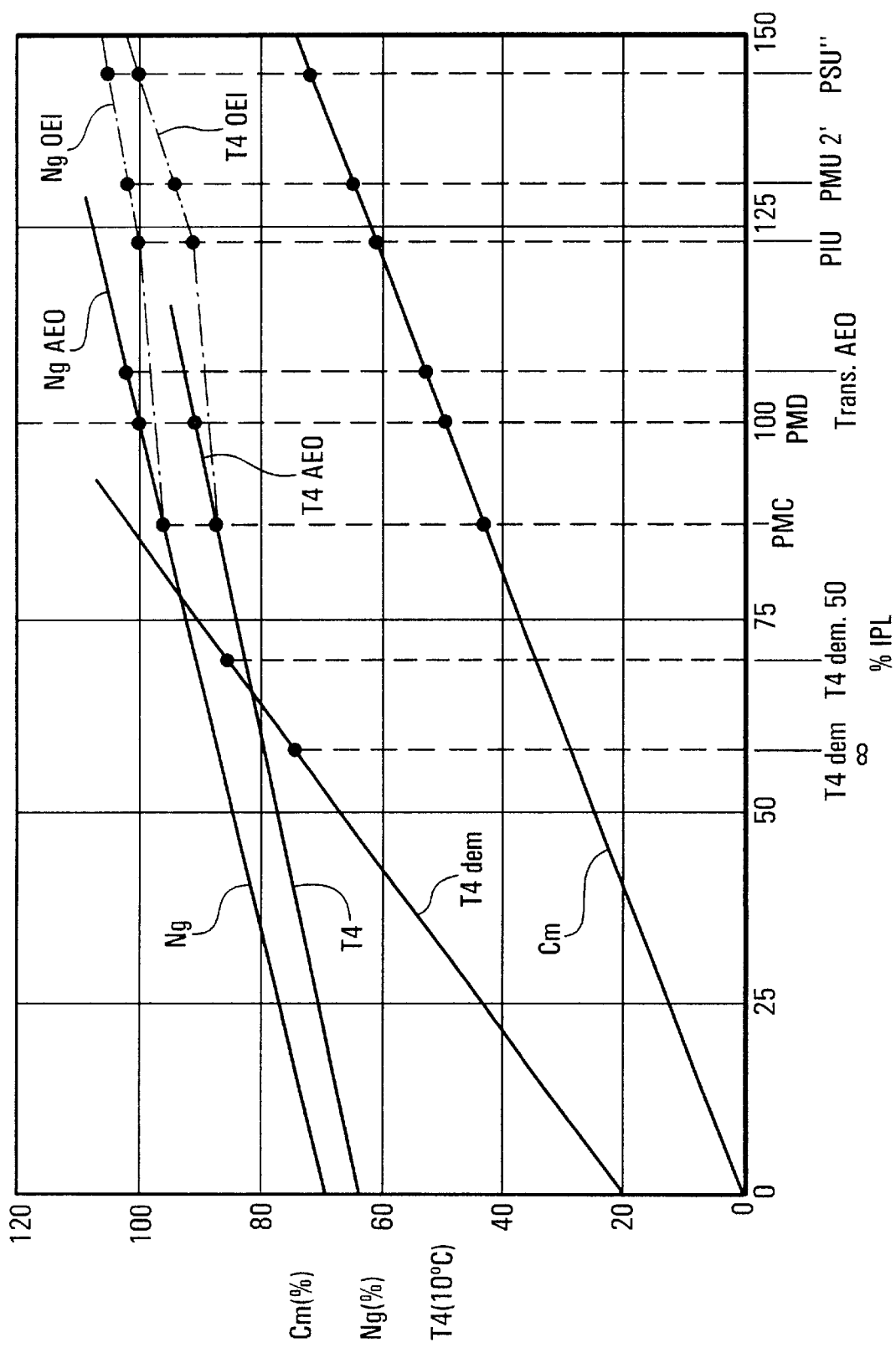
FIG. 4, similar to FIG. 3, illustrates a variant of the invention.

FIG. 4 gives, for each parameter, the position of the IPL needle in % as a function of the value of the measured parameter and of the mode of operation of the engine.

The highest % value of IPL corresponding to the measured parameters Ng, T4 and Cm is then presented for each engine.

In the same engine operating mode, the switch from one limiting parameter to another is continuous (no needle jump) by definition.

Torque (Cm)

The torque limits, referred to one engine, being staged, it is possible to get a single curve for all modes.

Moreover, the IPL graduation has been aligned with the torque. Throughout the domain in which the machine is torque-limited, the rate of movement will be identical on switching the limitations. There is no needle jump at a change of mode if the torque remains the limiting parameter.

Ng

The Ng limits not being staged, it is necessary to create one curve for the AEO mode and another for the OEI mode.

T4

The T4 limits not being staged, it is necessary to create one curve for the AEO mode and another for the OEI mode.

Moreover, on startup only, T4 is presented and, so that the temperature is correctly monitored, the T4 range is increased.

TABLE 2

Startup mode

| | IPL % | T4 (° C.) |
|---|---|---|
| | 0 | 200 |
| infinite | 58 | 750 |
| <10 s | 70 | 865 |

AEO mode

| | IPL (%) | Ng (%) | T4 (° C.) | Torque (%) |
|---|---|---|---|---|
| | 0 | 70 | 650 | 0 |
| PMC | 88 | NgPMDFADEC − 2.19 − NgderatingUI | 877 | 44 |
| PMD | 100 | NgPMDFADEC − NgderatingUI | 912 | 50 |

TABLE 2-continued

| | | | | |
|---|---|---|---|---|
| PMT | 107 | 102.3 | | 53.5 |
| OEI mode | | | | |
| | IPL (%) | Ng (%) | T4 (° C.) | Torque (%) |
| | 0 | 70 | 650 | 0 |
| PIU | 124 | NgPMDFADEC − 0.15 + NgderatingUI | 912 | 61.9 |
| PMU | 132 | NgPMDFADEC + 1.04 − NgderatingUI | 941 | 65.8 |
| PSU | 146 | NgPSUFADEC − NgderatingUI | 1000 | 72.9 |
| PMT | 163 | 105.52 | | 81.4 |

Notes:
The intermediate values will be interpolated between the points.
Extrapolation will be carried out with the same slope.
The derating of Ng will depend on UI, PO, TO and on Ng.
For each engine operating mode, the value of the IPL is the largest value calculated for each of the parameters Ng, T4 and Cm.

One way, given merely by way of example, of taking into account the electrical readings and the readings of P2 so as to comply with the limitations of the engines will be examined below.

This problem is more crucial with a first limitation instrument (IPL) since, in this case, T4 forms part of the flight control instrument whereas, on a conventional instrument panel, T4 is a monitoring parameter presented with a low accuracy of readout (20° C.).

When electrical readings are taken from the gas generator, with Ng constant, T4 increases as does the power. The electrical readings will be taken into account with the parameters: voltage U and current I of the generator. Ng remains constant so long as T4 calculated by a mathematical model, dependent on Ng, TO, PO, UI, remains below the T4 limitation in the corresponding regime. When T4 calculated reaches the limitation, Ng is derated so as to remain at T4 calculated=T4 limit.

The guaranteed minimum performance is calculated at this point with the minimum power, irrespective of the actual reading (generally, the maximum reading is a determining one).

The soundness of the engine is checked with minimum electrical consumption (equipment essential thereto, the others being switched off). It is necessary that the losses on implementation in the aircraft be determined with this same electrical reading (resetting with the mathematical model if the UI consumption during in-flight tests is different).

For the P2 reading:
heating is automatically cut off during OEI (master electric valve for P2 operated through a loss of power). The use of heating is prohibited on PMD except at the BTP limit. At the PMC limit, the engine will be operated on its T4 limit;

demisting by hot air may be prohibited on takeoff. The demisting demanded by the regulations will be accommodated by the cold air ventilation and/or by the use of the "bad weather" window; this so as not to derate the performance on takeoff because of the use of P2;

the sand filter (FAS) is switched off automatically during OEI (master electric valve for P2 operated through a loss of power). The sand filter is used on takeoff and while cruising. When it is active, derating is performed in the same way as for the heating. It is necessary to get the "FAS present" cue for the implementation-on-aircraft losses and the "FAS active" cue for the derating of Ng.

Figure 5:
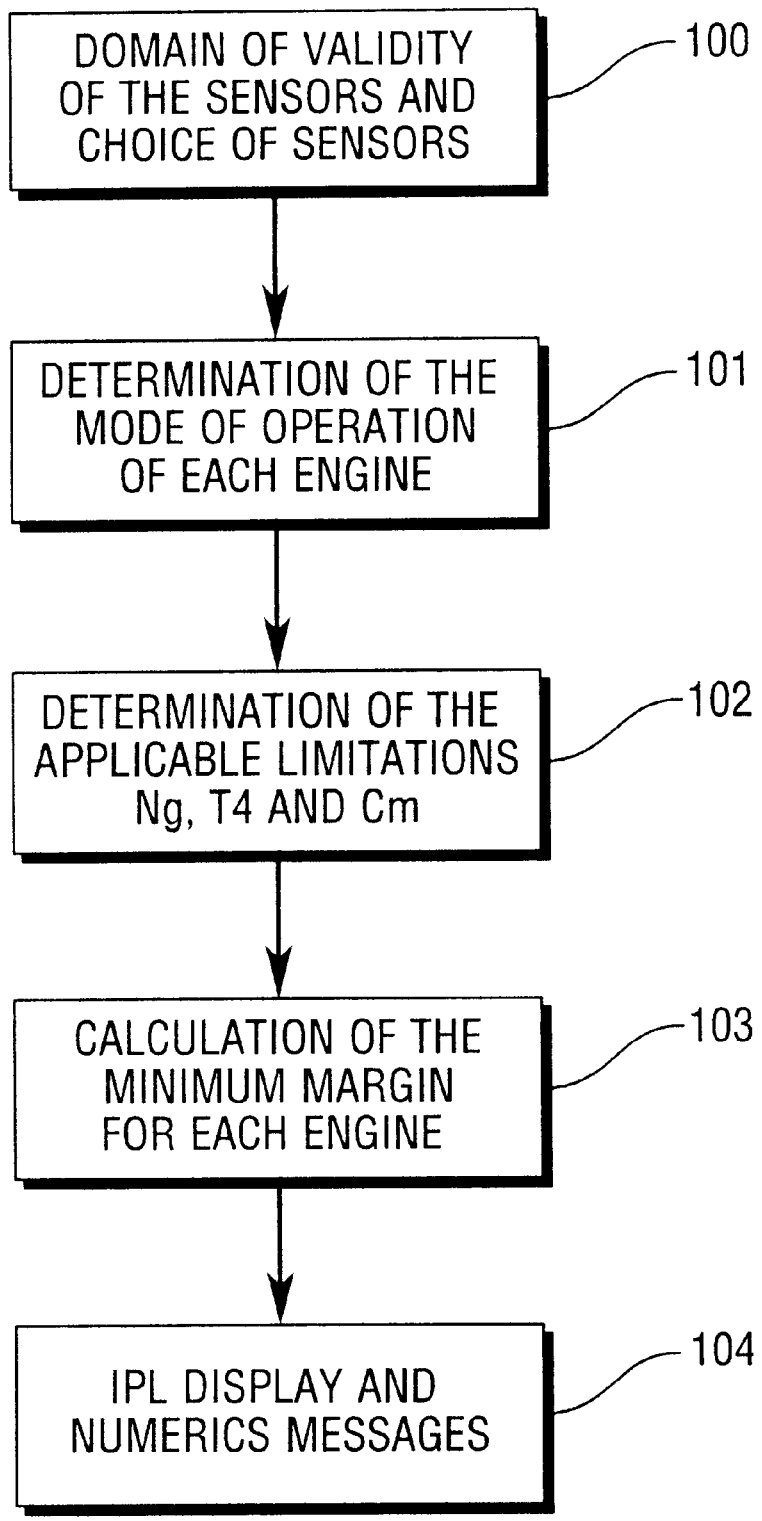
FIG. 5 is a general flow chart of the operation of the indicator according to the invention.

With regard to FIG. 5, the flow chart shown breaks down as follows:

100: domain of validity of the sensors and choice of sensors;

101: determination of the mode of operation of each engine;

102: determination of the applicable limitations Ng, T4 and Cm;

103: calculation of the minimum margin for each engine;

104: IPL display and numerics; messages.

What is claimed is:

1. A flight control indicator for twin-engine aircraft, in particular a rotary-wing aircraft, comprising two turboengines for driving at least one rotor, intended to provide the power margin available on the engines of the aircraft as a function of the flight conditions, comprising:

sensors (2, 3, 4) able to deliver information relating to various parameters for monitoring the engines, namely the gas generator regime (Ng), the free turbine inlet gas ejection temperature (T4), and the engine torque (Cm), means (5) for processing the information arising from said sensors, and display means (6) which present, on display screen (7), the processed information relating to the parameter, from among said monitoring parameters, whose current value is closest to the limit value for said parameter, wherein said display means (6) presents a single dial (8) furnished with two needles ($9_1$, $9_2$), each of them corresponding to a respective engine, and positioned in such a way that, when the engines are operating normally, the two needles are merged, and each needle ($9_1$, $9_2$) presenting the smallest margin between the gas generator regime (Ng), the free turbine inlet gas ejection temperature (T4), and the engine torque (Cm), said display means having two distinct graduations making it possible to differentiate, in flight, an idling engine from an engine which is faulty or has almost shut down.

2. The indicator as claimed in claim 1, wherein, for each engine, one mode, from among the various possible modes of operation of the engines, is automatically selected and displayed on said dial (8) as a function of the state of the engine.

3. The indicator as claimed in claim 2, wherein, for each mode of operation of the engines, the corresponding limitations, functions of the state of the engines and of their environments, in particular power limitations, are presented on said dial (8).

4. The indicator as claimed in claim 2, wherein, in startup mode, only the two limits of T4 at startup are presented.

5. The indicator as claimed in claim 1, comprising the displaying, on said display means (6), of the true numerical values of various parameters.

6. The indicator as claimed in claim 1, comprising mobile graduations.

7. A flight control indicator for twin-engine aircraft, in particular a rotary-wing aircraft, comprising two turboengines for driving at least one rotor, intended to provide the power margin available on the engines of the aircraft as a function of the flight conditions, comprising:

sensors (2, 3, 4) able to deliver information relating to various parameters for monitoring the engines, namely the gas generator regime (Ng), the free turbine inlet gas ejection temperature (T4), and the engine torque (Cm), means (5) for processing the information arising from said sensors, and display means (6) which present, on a display screen (7), the processed information relating to the parameter, from among said monitoring parameters, whose current value is closest to the limit value for said parameter, wherein said display means (6) present a single dial (8) furnished with two needles ($9_1$, $9_2$), each of them corresponding to a respective engine, and positioned in such a way that, when the engines are operating normally, the two needles are merged, and each needle ($9_1$, $9_2$) presenting the smallest margin between the gas generator regime (Ng), the free turbine inlet gas ejection temperature (T4), and the engine torque (Cm), and wherein, for each engine, one mode, from among the various possible modes of operation of the engines, is automatically selected and displayed on said dial (8) as a function of the state of the engines, only the two limits of T4 at startup being presented in startup mode.

8. The indicator as claimed in claim 7, wherein, for each mode of operation of the engines, the corresponding limitations, functions of the state of the engines and of their environments, in particular power limitations, are presented on said dial (8).

9. The indicator as claimed in claim 7, comprising the displaying, on said display means (6), of the true numerical values of various parameters.

10. The indicator as claimed in claim 7, comprising two distinct graduations making it possible to differentiate, in flight, an idling engine from an engine which is faulty or has almost shut down.

11. The indicator as claimed in claim 7, comprising mobile graduations.

* * * * *